J. WALLACE.
RAKE.
APPLICATION FILED APR. 19, 1917.
1,277,509.
Patented Sept. 3, 1918.
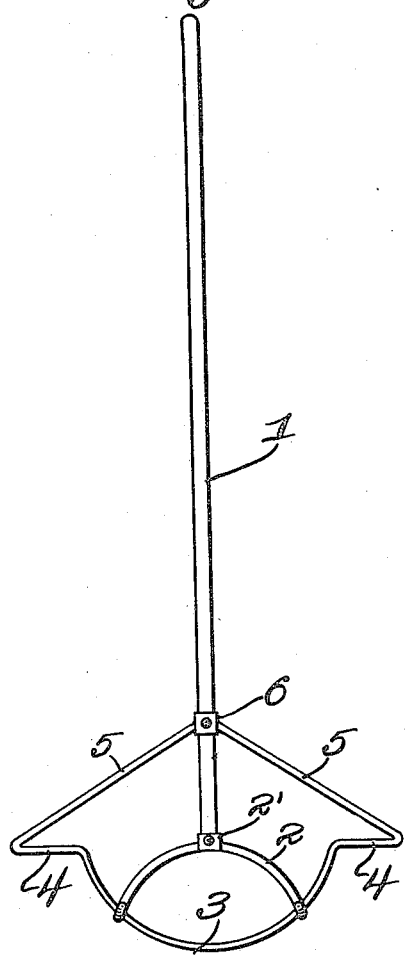
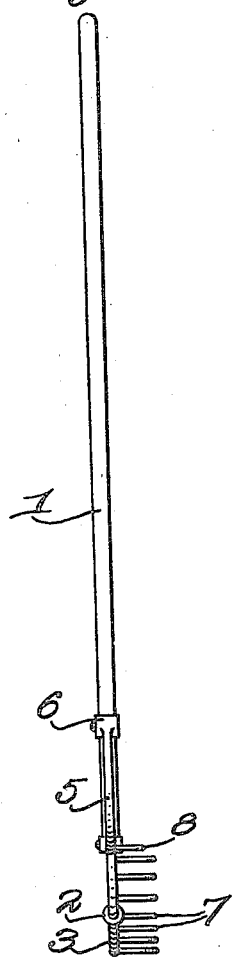
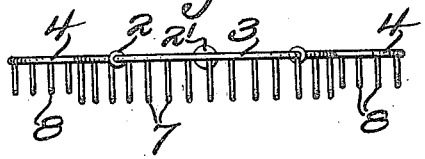
INVENTOR
Jennie Wallace.
BY Richard Owen.
ATTORNEY
WITNESSES
John P. Woodworth
L. B. Middleton

UNITED STATES PATENT OFFICE.

JENNIE WALLACE, OF HYDE PARK, MASSACHUSETTS.

RAKE.

1,277,509.

Specification of Letters Patent.

Patented Sept. 3, 1918.

Application filed April 19, 1917. Serial No. 163,237.

*To all whom it may concern:*

Be it known that I, JENNIE WALLACE, a citizen of the United States, residing at Hyde Park, in the county of Suffolk and State of Massachusetts, have invented certain new and useful Improvements in Rakes, of which the following is a specification.

This invention relates to new and useful improvements in rakes and the principal object of the invention is to provide a rake of such shape as to hold the raked material between the ends of the rake and prevent the same from being thrown to either side.

Another object of the invention is to make the teeth of different lengths.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:

Figure 1 is a top view of the rake.

Fig. 2 is a side view thereof.

Fig. 3 is an end view.

In these figures, 1 indicates the handle provided with an inwardly curved transverse member 2 at its extreme end, the two ends of which embrace the outwardly curved transverse part 3 of the teeth carrying member, said member having its ends bent transversely of the handle to form straight parts 4 at each end and to the extreme ends of these parts braces 5 are secured, said braces converging to a point 6 where they are secured to the handle 1. All of the said parts lie preferably in the same plane with the handle. The curved part 3 has the depending teeth 7 secured thereon and the parts 4 carry the depending teeth 8 and the said teeth 8 are shorter than the teeth 7, as shown in Fig. 3. The parts 4 with the short teeth 8 are provided so that the raked material is prevented from passing around the ends of the rake while in use, and to support the raked material upon the outwardly curved transverse part 3 while the rake is being lifted to pitch the material to an elevated position.

The rake may be formed of any suitable material, and the different parts may be connected together in any suitable manner, but in the drawings the rake carrying parts 3 and 4 and the two braces 5 are shown as formed of one piece of wire or steel bent into the proper form and having the two ends secured to the handle at 6. The drawing also shows the curved member 2 secured to the end of the rake handle by a clip 2' and having its ends looped around the member 3. The teeth may be welded onto the rake head or said head may be provided with holes to receive the teeth.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. A rake comprising a handle, a curved member secured at its middle part to the extreme end of said handle, a curved bar secured to the ends of said curved member, straight end portions on said curved bar, teeth carried by said curved bar and shorter teeth carried by the end portions and braces extending from the end portions to the handle.

2. A rake comprising a handle, an inwardly curved toothed bar secured to the end thereof, transverse straight end portions carried by the toothed bar, and said end portions provided with teeth shorter than those of the toothed bar.

3. A rake comprising a handle, a bar having a central portion of inwardly curved form and transverse end portions, a member connected to the handle and the bar for supporting the same, teeth depending from said central portion, and shorter teeth depending from said end portions.

In testimony whereof I affix my signature in presence of two witnesses.

JENNIE WALLACE.

Witnesses:

Mrs. WALTER P. BAGLEY,
ROBERT E. BENNETT.

Copies of this patent may be obtained for five cents each, by addressing the "Commissioner of Patents, Washington, D. C."